US007529711B2

(12) United States Patent
Reith (10) Patent No.: US 7,529,711 B2
(45) Date of Patent: May 5, 2009

(54) METHOD AND SYSTEM FOR PROVIDING AND BILLING INTERNET SERVICES

(75) Inventor: Lothar Reith, Frankfurt (DE)

(73) Assignee: Nortel Networks Limited, St. Laurent, Quebec (CA)

( * ) Notice: Subject to any disclaimer, the term of this patent is extended or adjusted under 35 U.S.C. 154(b) by 1461 days.

(21) Appl. No.: 09/999,267

(22) Filed: Oct. 31, 2001

(65) Prior Publication Data

US 2003/0083988 A1    May 1, 2003

(51) Int. Cl.
    G06Q 40/00    (2006.01)
(52) U.S. Cl. ........................................... 705/40
(58) Field of Classification Search .................... 705/40
    See application file for complete search history.

(56) References Cited

U.S. PATENT DOCUMENTS

| | | | | |
|---|---|---|---|---|
| 5,745,556 | A * | 4/1998 | Ronen | 379/127.05 |
| 5,745,884 | A * | 4/1998 | Carnegie et al. | 705/34 |
| 5,845,073 | A * | 12/1998 | Carlin et al. | 709/217 |
| 5,864,610 | A * | 1/1999 | Ronen | 379/121.01 |
| 6,119,152 | A * | 9/2000 | Carlin et al. | 709/217 |
| 6,266,401 | B1 * | 7/2001 | Marchbanks et al. | 379/116 |
| 6,266,406 | B1 * | 7/2001 | Mercouroff et al. | 379/230 |
| 6,418,467 | B1 * | 7/2002 | Schweitzer et al. | 709/223 |
| 6,606,606 | B2 * | 8/2003 | Starr | 705/36 R |
| 6,700,962 | B1 * | 3/2004 | Albal et al. | 379/126 |
| 7,092,398 | B2 * | 8/2006 | Schweitzer | 370/401 |
| 7,272,218 | B2 * | 9/2007 | Chien | 379/115.01 |
| 2001/0010047 | A1 * | 7/2001 | Shen et al. | 705/400 |
| 2001/0012345 | A1 * | 8/2001 | Nolting et al. | 379/112.01 |
| 2001/0034677 | A1 * | 10/2001 | Farhat et al. | 705/30 |
| 2001/0034693 | A1 * | 10/2001 | Farhat et al. | 705/37 |
| 2001/0034704 | A1 * | 10/2001 | Farhat et al. | 705/39 |

(Continued)

FOREIGN PATENT DOCUMENTS

EP    866596 A2 *    9/1998

(Continued)

OTHER PUBLICATIONS

Semilof, "Charging for IP use gets easier," Computer Reseller News, n808 pp. 6.*

(Continued)

*Primary Examiner*—Jagdish N Patel
*Assistant Examiner*—Sara Chandler
(74) *Attorney, Agent, or Firm*—Mintz, Levin, Cohn, Ferris, Glovsky and Popeo PC (57) ABSTRACT

The present invention relates to systems and methods for providing and billing Internet services that allow a user to select a service profile among a plurality of service profiles. The present invention assigns a service telephone number to each of the service profiles, such that each service profile is uniquely identified by its service telephone number. When the user selects and logs on to one of the service profiles, the present invention checks whether the user has subscribed for being billed on a user telephone number through a telephone network operator, and, if this is the case, the present invention allows access to the selected service profile. When access is allowed, the present invention creates a call detail record including the user telephone number as calling number and the service telephone number of the selected service profile as called number. The present invention then transmits the call detail record to a billing system of the telephone network operator.

11 Claims, 7 Drawing Sheets

U.S. PATENT DOCUMENTS

| | | | |
|---|---|---|---|
| 2001/0034833 A1* | 10/2001 | Yagasaki et al. | 713/156 |
| 2001/0055291 A1* | 12/2001 | Schweitzer | 370/337 |
| 2002/0133412 A1* | 9/2002 | Oliver et al. | 705/26 |
| 2002/0147002 A1* | 10/2002 | Trop et al. | 455/406 |
| 2003/0033253 A1* | 2/2003 | Rhodes | 705/52 |
| 2003/0074286 A1* | 4/2003 | Rodrigo | 705/32 |
| 2003/0123628 A1* | 7/2003 | Rhodes | 379/114.01 |
| 2004/0102182 A1* | 5/2004 | Reith et al. | 455/410 |

OTHER PUBLICATIONS

Vittore, IP billing model emerges: Xacct unveils engine under the hood (Xacct Technologies) (Product Announcement), Telephony, n ISSN 0040-2656, Sep. 21, 1998.*

Lawton, "The Internet grows up", Global Telephony, n 1067-6317, Dec. 1998.*

Vittore, "IP billing model emerges", Telephony v235n12 pp. 92, Sep. 21, 1998.*

Doster, "Beyond call accounting: network accounting!", Teleconnect, v 15, n3, p 127(1), Mar. 1997.*

Barbetta, "Internet billing starts ticking", Telephony, v234n25 pp. 20-28, Jun. 22, 1998.*

Vittore, "How to turn IP voice hype into revenue.", Telephony v235, n4, pNA (1), Jul. 27, 1998.*

Uberoi, "Billing for Value-Added IP Services," (Product Announcement), Telecommunications, v33, n8, p. 36, Aug. 1999.*

XaCCT Technologies website (Jun. 29, 1998) via Wayback Machine at www.archive.org (search done Aug. 24, 2006).*

Webster's II Dictionary, Third Edition. Houghton Mifflin Company (New York). Copyright 2005.*

Random House College Dictionary, Revised Edition. Random House (New York). Copyright 1988.*

Definition- call detail record, Webopedia @ http://www.webopedia.com/, 3 pages.*

Definition- call detail recording (CDR), CREDOreference @ http://www.xreferplus.com, 1 page.*

Definition- Call detail record, Wikipedia @ http://en.wikipedia.org.*

Combine Billing USBI and Bell Atlantic, Jul. 22, 1998.*

"Australia: Flexible Billing Key to IP Telephony." Exchange Telecommunications Newsletter. Jul. 23, 1999.*

"Billing for value-added IP Services," by Anil Uberoi and Paul M Hoff. Telecommunications (Americas Editon) v33n8 pp. 36-38. Aug. 1999.*

"Internet Billing starts ticking," by Frank Barbetta, Telephony. V234n25. pp. 20-28.*

"Networks Telephony Corp. Turns Internet Service Providers Into Phone Companies With Everyline PC-to-Phone Service." Feb. 1, 1999.*

"Seven comments on charging and billing," by Philip Ginzboorg. Association for Computing Machinery, Communications of the ACM. V43n11.Nov. 2000.*

Definition- call detail record, Webopedia @ http://www.webopedia.com, 3 pages, no date/date unknown.*

Definition- call detail recording (CDR), CREDOreference @ http://www.xreferplus.com, 1 page, no date/date unknown.*

Definition- Call detail record, Wikipedia @ http://en.wikipedia.org (via Internet Jan. 23, 2008, no date/date unknown).*

"Internet Billing starts ticking," by Frank Barbetta, Telephony. V234n25. pp. 20-28. Jun. 22, 1998.*

* cited by examiner

```
                            48
              50          /
             /     MONTHLY BILL
User Telepone No.: 0521/914940

Called No.   Item         Date      Time    Duration    Rate          Units    Amount
                          (dd.mm.jj)        (hh.mm.ss)                         ($)

089/1234567  long dist. call  02.10.01  08.34    1.34    0.1000 $/m     2      0.20
0190/111111  ISP standard     03.10.01  09.05  01.01.00  0.0002 $/s   3260     0.65
0190/111112  ISP premium      03.10.01  10.06    10.00   0.0010 $/s    600     0.60
0190/111145  ISP contents     05.10.01  22.12   (global) 2.4000 $       1      2.40
0190/111112  ISP premium      06.10.01  00.15    30.00   0.0005 $/s   1800     0.90
    /
   52
```

METHOD AND SYSTEM FOR PROVIDING AND BILLING INTERNET SERVICES

BACKGROUND OF THE INVENTION

The invention relates to a method and system for providing and billing Internet services, wherein a user may select among a plurality of service profiles.

The service profiles offered by Internet Service Providers (ISPs) may differ from one another in various aspects. These aspects include for example the upstream and downstream line rate at which the service provider will allow the user to transmit and receive data at the IP layer, the way he treats each IP packet in the context of an online session (QoS—Quality of Service, Firewall functionality, access rights to certain contents, access rights to certain applications or web-services, right to join a VPN (Virtual Private Network) or a corporate intranet) and the way the ISP treats personal data of the user (privacy-level), the way and extent the ISP exposes the personal data and the identity of the user to third parties (anonymity level), and the way the user wants to pay (selected payment partner and method, prepaid, postpaid, by spending loyalty points, postpaid with ceiling, advertising subsidised or not, or a combination of these).

At present, a user subscribes to a specific service profile offered by a specific ISP, and he will then be billed for this service profile, for example on the basis of connection time or on a flat rate basis. The costs will of course depend on the features included in the service profile to which the user has subscribed. If the user wants to change to another service profile having different features, he will have to subscribe to the new service profile, and he will then be billed for this profile.

This limits the flexibility with which the user may adapt his service profile to varying demands and/or financial resources. If the user subscribes to a plurality of service profiles at a time, a different user ID will be assigned for each service profile, and the user will receive separate bills for each user ID. This billing system Incurs high administrative costs on behalf of the service provider and lacks transparency from the view point of the user.

The known system is not suitable for frequent changes of the user profile. Even if it may be possible today to use the same User-ID while connecting to multiple services, it is still inconvenient for the user to have to re-authenticate to a new service profile in order to simply change to a better QoS for example (and to disconnect from the previous profile in order to avoid being charged for it in parallel). Today, ISPs are often using flatrate billing because they have been unable to find and implement a customer accepted, well understood billing method for data services. This severely limits their ability to offer differentiated services and therefore severely limits their options to reach profitability. This is especially true for the UMTS service providers, who have taken on high cost which will hardly be recoverable with a flatrate service for internet access.

In the European patent application 01 107 141, the applicant has proposed a method of providing Internet services, which, within the framework of a multi-functional prepaid system, permits the user to change the service profile within a running session. Thus, the session will be subdivided Into a plurality of sub-sessions to which different service profiles apply, and the rate with which the prepaid account of the user is charged will depend on the selected service profile.

SUMMARY OF THE INVENTION

It is an object of the invention to provide a method and system for providing and billing Internet services, which is efficient and easy to implement on behalf of the Internet Service Provider and in which the billing system is comprehensive and transparent for the user.

According to the invention, this object is achieved by a method comprising the steps of:
  assigning a service telephone number to each of said service profiles, such that each service profile is uniquely identified by Its service telephone number,
  when a user selects and logs on to one of said service profiles, checking whether the user has subscribed for being billed on a user telephone number through a telephone network operator, and, if this is the case, allowing access to the selected service profile,
  when access is allowed, creating a call detail record including the user telephone number as calling number and the service telephone number of the selected service profile as called number, and
  transmitting the call detail record to a billing system of said telephone network operator.

The existing telephone networks are very mature ubiquitous networks with a very easy to learn and user friendly user interface which everyone understands, and they provide a well accepted way of billing with a monthly consolidated and itemised bill from a trusted supplier. Most people trust their telephone provider in terms of how he treats his personal data, takes care of privacy issues etc. The hardware and software implementations available in today's telephone networks provide the possibility to offer special value-added services, e.g. information services of various kinds, to which the user can get access through the telephone network by dialling a service telephone number that is specifically assigned to this service, such as, in Germany for example, a number starting with "0190 . . . " or so-called online service numbers starting with 019x (with x=1,2,3,4) in Germany or In near future numbers starting with 0900 for value added services (in all countries). The user will then be charged for this service, e.g. on the basis of connection time, on his monthly telephone bill. Certain embodiments also meet the German law which forces telecommunications service providers to honor customer requested monthly payment ceilings.

This billing system utilises the billing functionality of the telephone network, which involves the creation of a Call Detail Record (CDR) for each telephone call that is being established. The CDR is a data record that is largely standardised and, accordingly, is portable among different telephone networks, and that includes at least a calling number (i.e. the telephone number of the user) and a called number (i.e. the service number of the information service to which the user gets access). Typically, the CDR also includes time information permitting the user to be billed per connection time. This time information may for example include a time stamp indicating the time at which the connection was established, and another time stamp indicating the time at which the connection was terminated, or one these both time stamps in combination with the duration of the connection. The billing functionality within the telephone network includes one or more data bases permitting to identify the user and the address of the billed party (either the user, or a sponsor in case of 0800 numbers, or both in case of split-charge numbers). The billing functionality includes a rating mechanism, which determines the charges based on information found in the CDR, such as time of day, day of week, duration of the call, and tarif related data entered by the network operator and held in the billing databases such as the tarif per unit (e.g. second or minute) for the specific services, and potential discounts applicable to certain users.

According to the invention, this technology, which is existing already for the purpose of billing telephone services, is made available for billing Internet services as well, including billing for value added internet services such as content based billing or QoS billing or split charges and called party pays (0800 calls for sponsored access to certain contents such as e-business web-sites). It should be noted that Internet services in the context of thus application are not limited to services that provide access to the Internet, but also value added (or value reduced) Internet services on top of plain Internet access services or independently of plain Internet access services by establishing a logical access service via tunneling mechanisms such as the standard IPsec, L2TP or PPTP tunneling mechanisms. Examples of value added Internet service profiles are: metered access to premium content such as viewing a sport event "live", metered access to web-services, metered access to application service providers, (metered) temporary access to a certain private intranet (VPN—Virtual Private Network), metered temporary access with higher than standard QoS (Quality of Service), metered access with gaining loyalty points in a loyalty system, metered access in exchange for spending loyalty points. Examples of reduced value Internet services are: advertising break interrupted Internet service, Internet service with advertising insertion in the form of Pop Up-windows or forced ISPspecific http-frames in the browser display, access with a lower QoS than the standard QoS.

According to the invention, a user who subscribes to the services of an Internet Service Provider doesn't have to subscribe to a specific service profile, but he simply has to indicate his telephone network operator and his telephone number and to agree that he will be billed over the telephone bill of the telephone network operator. The user may then flexibly change the default setting for the service profile that is provisioned for him when he logs on to an Internet session (a Default Start Profile), and he may even change the service profile during the session and also change his start profile according to his personal preferences. The expenses incurred for the various service profiles will all appear on a single bill, e.g. a monthly bill, together with expenses for other telephone services. On this bill, the service profiles that have been used are identified by their service telephone numbers which are indicated on the telephone bill, together with other useful information such as log-on times, connection times (durations), charge rates and the like. It will be understood that this system is not limited to a specific payment mode but may be used in various modes such as prepaid, postpaid, postpaid with ceiling, and the like. In any case, even in the prepaid mode, the telephone bill will help the user to keep track of his expenses for Internet services. It will also enable the user and the network operator to minimize the risk of misuse and fraud by user requested payment ceilings for telephone billed IP Services or by networks operator set ceilings for fraud prevention, that may be implemented in certain embodiments that include a multi-functional prepaid logic according to applicants european patent application 01 107 141.

An Item (value added IP Service) is predefined by the service provider and constitutes an IP Service Profile that may be applied for a certain time duration to a user's access-session. A part-session is defined as that part (duration) of an access session which is associated with a singe item (service profile). In most cases, the price of an item is measured in time units—such as per second or per minute. So the service provider will advertise the item including a pricetag per second or per minute (this advertisement may also use vanity numbers). Alternatively, the pricetag may be measured in a more complicated way, such as per volume of data transmitted or also location based, or as a combination of time, volume and location elements. An important feature of the invention is, that the item is identified by a telephone number (i.e. the name of the item is a numeric value according to the standard E. 164 numbering plan or in any case in a format that is understood by the telephone network).

More specific embodiments of the invention are indicated in the dependent claims.

A system for providing Internet services, to which the invention is applicable, typically comprises a user data base storing a user ID and other user information such as a password etc. for each subscriber, authentication means for checking the authentication and authorisation of a user who is logging on, and a network element which is called Network Service Switch (NSS), forming the subscriber edge of the IP network and having the function to provision and enforce Internet services on a per-subscriber basis.

The present invention may be implemented in such a system by including one or multiple of the following three key innovations:

a) The NSS creates telephony type CDRs at the time of termination of a part-session with a certain service profile, which can be processed by a legacy telephone network operator billing system without requiring major modifications of the billing system, as the service profile used during the past part session is being identified by a telephone number. As this very much resembles the current process of creating CDRs at the time of termination of a voice call, it is very straightforward for existing billing systems—in fact probably requires no software modification at all at the side of the legacy billing system.

b) A session manager application which will be called Internet Service Controller hereinafter creates telephony type CDRs when terminating a part-session or when receiving a notification that the online-session has been terminated (such as via a RADIUS Accounting Stop message). Usually, either a) or b) applies to a specific user, but in some instances a combination of a) and b) may be deployed for different users and even for the same user, for example when billing is done with multiple payment sources, such as billing some services in realtime via loyalty points and other services in non-realtime for postpaid customers via the telephone bill.

c) A method and system that allows a user to signal a service profile change request to the Internet Service Controller simply by calling the telephone number that uniquely identifies the requested value added IP Service, or by entering the telephone number identifying the selected service over a previously established communications channel to the Internet Service Controller. The innovation c) may be present in combination with either a) or b) or with both a) and b) or with neither a) and b) in case that the billing is done in the telephony network based purely on the CDRs created within the telephony network for the "voice-call" that signals the service profile change request.

The system variations possible according to the above definition may be combined with a multifunctional prepaid logic according to the applicants above mentioned European patent application 01 107 141, in order to provide realtime prepaid and realtime postpaid billing capabilities when required, with the specific detail that the name of the service profile may of course be a telephone number as it is an alphanumeric name, and a telephone number may be interpreted as the name of a service profile. A multifunctional prepaid system of this type may also be used for example for the enforcement of payment ceilings in realtime, for the spending or gaining of loyalty points, or for realtime billing (prepaid and postpaid) with or without electronic bill presentment and payment (EBPP).

In one embodiment, the telephone network is used also for selecting or changing the service profile. Since each service profile is uniquely identified by a service telephone number, this can be achieved most easily by dialling the telephone number assigned to the desired service profile.

In those embodiments where the service profile selection via some form of user to network signalling will be done via a web-based Content and Policy Selection Portal, the Internet Service Controller will be combined with the Content and Policy Selection Portal and basically performs the actual change of the service profile by interfacing to the NSS.

In those embodiments where the user-to-network signalling will be done via the telephone network, the receiver of the signalling will be an Internet Service Controller (ISC) which resides either inside the telephone signalling network or at the edge of the telephone network like a PBX does. The following are variations depending on the location of the ISC and also depending on whether the ISC relies on the authentication done inside the telephone network (explicit authentication) or whether he has to authenticate the user by himself (explicit authentication). Independent of the variation, the ISC will invoke the requested service profile by sending a message to the Network Service Switch (NSS) at the edge of the IP network of the service provider, which is providing the IP service to the requesting user, and request the NSS to change the service profile of the user immediately. Accounting and billing may be done using a time-stamped record (termed "Call Detail Record" in the context of this invention) created by the NSS or by the ISC, or using a time-stamped Call Detail Record created in the telephone network.

In one embodiment, the procedure for selecting or changing the service profile is achieved by an established short call which is received by the Internet Service Controller which will Instruct the Network Service Switch to provision the new service profile. In another embodiment, this procedure is achieved by a non-established call which utilises only the signalling functionality of the telephone network. In this case, the Internet Service Controller communicates with a Signalling Transfer Point (STP) or a Signalling End Point (SEP) in the telephone network, and the call of the user is rejected already at the level of STP or SEP without a call connection being established. However, the STP sends a message including the dialled number to the Internet Service Controller (ISC), thereby informing the ISC that the user has selected the service profile associated with the dialled number. In order to avoid confusion of the user whose selection call is rejected, the call rejection may be accompanied by an automatically generated voice message advising the user that his Service Profile Change Request has been received and will be processed (or has been successfully processed).

In both embodiments, the telephone network will have to handle a large number of profile selection calls which have only a very short duration of (e.g. one second) or are not even established at all (so called unsuccessfull call attempt, which however may generate a meaningful announcement to the user), whereas, in normal voice traffic, the average call hold time (duration of the call) is significantly larger. As a result, a large number of profile selection calls will tend to reduce the average call hold time in the telephone network and to cause a disproportional increase in the signalling traffic relative to the voice carrier traffic. On the other hand, existing telephone networks have originally been designed for handling voice traffic with an average call hold time of at most several minutes, (very often 3 minutes) but are now increasingly used for providing user access to the Internet Network Service Switches. This Internet traffic, on the contrary, is characterized by very long call hold times, often in the order of an hour or more, with the result that the capabilities of the signalling network are not fully exploited today, especially not during the peak evening hours of residential Internet usage, where also the signalling traffic for service profile change requests is expected to peek. Thus, if the telephone network is used for both Internet access and for the service profile selection according to the invention, then the two effects on the average call hold time discussed above tend to cancel each other and, accordingly, the invention has the advantage that a reasonable balance between the carrier part and the signalling part of the telephone network can be reestablished, and otherwise idle signalling resources can be profitably exploited by the telephone network operator. In the event, that signalling traffic would surge beyond capacity, potential signalling system bottlenecks can be voided by placing STPs (such as the "Broadband STP" product of Nortel Networks) close to the existing Class 5 Switches, where the signalling traffic originates, and use the scenario/embodiment where already an unsuccessfull call attempt is sufficient to change a service profile.

The invention is not only applicable to wireline telephone networks but also to wireless telephone networks and is particularly attractive in connection with advanced wireless networks such as GPRS or UMTS which allow profile selection calls over the voice channel and also Internet access over the data channel of a single terminal device.

BRIEF DESCRIPTION OF THE DRAWINGS

Preferred embodiments of the invention will now be described in conjunction with the drawings, in which.

DESCRIPTION OF PREFERRED EMBODIMENTS

Figure 1:
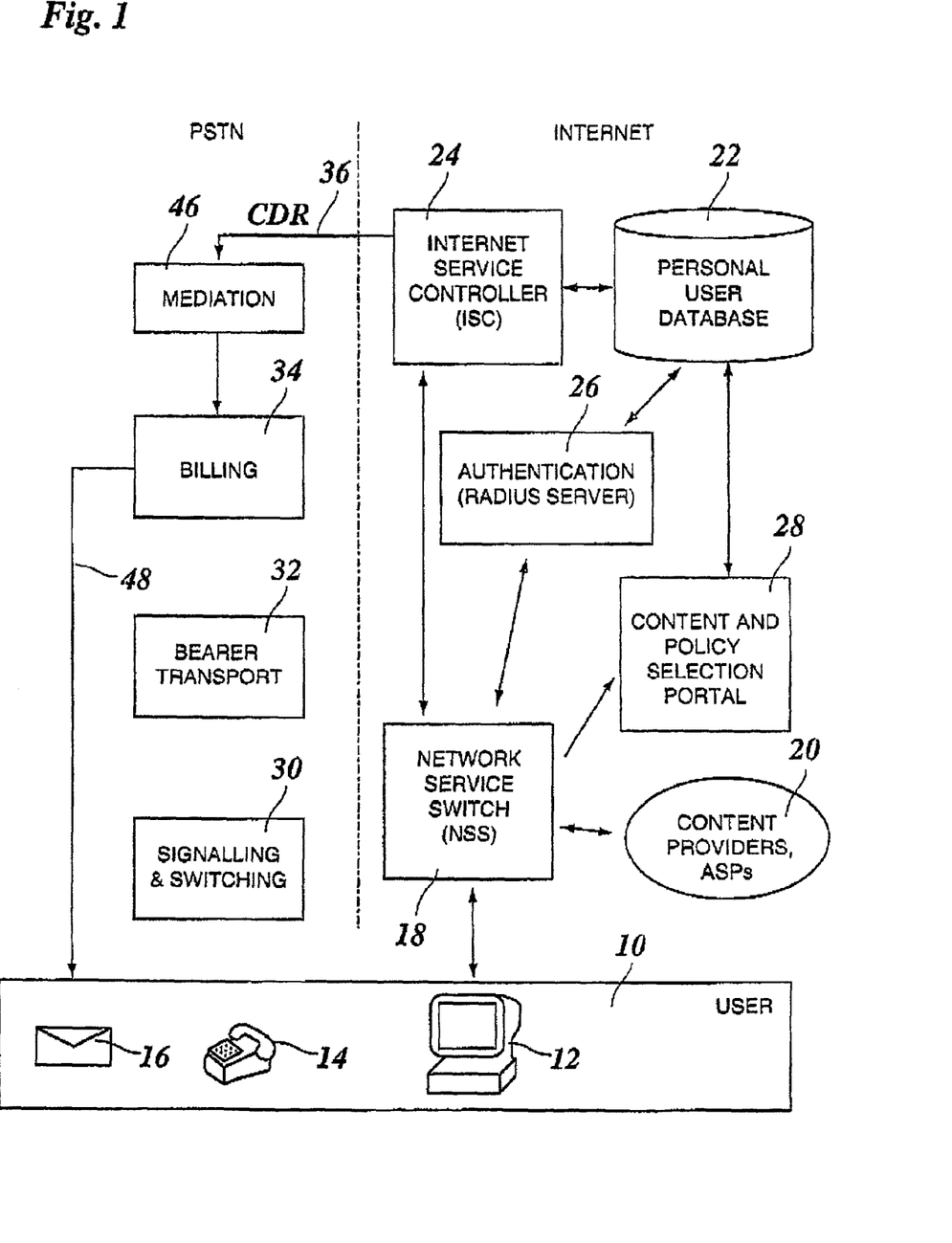
FIG. 1 is a block diagram of a system for providing and billing Internet services in accordance with the invention.

As is shown in FIG. 1, a user 10 has an Internet terminal, e.g. a personal computer 12, a telephone 14 connected to a telephone network PSTN (Public Switched Telephone Network), and a mailbox 16 for receiving printed telephone bills by mail or e-mail.

The user 10 accesses the Internet via his personal computer 12 and a Network Service Switch 18 (NSS) that is operated by an Internet Service Provider. The NSS 18 determines the contents to which the user 10 has access. These contents may include the totality or a restricted selection of contents 20 that are accessible over the Internet, including contents hosted by content providers, Application Service Providers (ASP), streaming providers, web-services providers, contents accessible only for VPN members, and the like.

The service provider has a database called Personal User Database 22 and at least one application called Internet Service Controller (ISC) 24 as well as at least one server application 26 for authentication purposes (such as a RADIUS or LDAP server used for authentication). These components implement the complete services logic describing the Internet users (subscribers), as has been explained in detail in the European patent application 01 107 141.

The service provider further provides a website 28 called "Content and Policy Selection Portal", which can be visited by the user at any time during the session and permits the user to change his service profile within the session. In this case, the service selection (item ordering) is done with a web-based user interface, where the selected item is being uniquely identified by one or multiple names, of which one is a telephone number.

The telephone network PSTN, to which the telephone 14 of the user is connected, has been represented in FIG. 1 by its three main logical function block a signalling system 30 which handles the end to end signalling traffic originated from users, including the switching and control functions as found in the traditional voice switches and modern soft switches and call controllers in VoIP based telephone networks, a (voice) bearer transport system 32 which provides the bearer channels for voice traffic (and possibly data traffic) over the telephone network, including the transmission facilities and the peripheral elements of traditional switches terminating TDM based bearer channels or mediagate-ways in voice over packet technology based telephone networks, and a billing system 34 which is originally designed for automatic accounting and billing of the telephone services provided by the operator of the PSTN. The components of the telephone network are known as such and will therefore not be described in detail.

When the user 10 subscribes to the services of the Internet Service Provider, he agrees that the Internet services will be billed over the telephone bill that is created by the billing system 34 of the PSTN, and he indicates a user telephone number, i.e. the number, under which his telephone 14 is accessible over the PSTN and/or for which he is billed by the operator of the PSTN, This user telephone number is stored in the Personal User Database 22, optionally together with a user ID, and optionally also one or multiple tokens such as a password for authentication purposes and other relevant user information.

When the user 10 accesses the Internet service, he will logically connect to the Network Lace Switch (NSS) 18 and receive his IP-service connectivity from the NSS. The access network connecting the personal computer 12 to the NSS 18 may be the same PSTN to which the telephone 14 is connected, but may as well be another telephone network or even an IP based access network. The NSS 18 will via the known RADIUS protocol communicate with the RADIUS server 26 to 16 authenticate the user. The RADIUS server 26 looks up the user record in the database 12, and if it finds the user, the password matches, and the user record also includes a valid user telephone number for billing purposes, the RADIUS server will send a positive authentication to the NSS 18 and authorize the user with either a default start profile or a personalize start profile if a preferred start profile had been previously selected by the user (and thus stored in the personal user database). The RADIUS server will modify the user record in the database to indicate tat this user is currently an active user.

The Network Service Switch 18 is capable of provisioning and enforcing, for this user, one of a plurality of service profiles which may differ from one another in the Quality of Service, the contents to which access is allowed, the privacy policy, and the like, and also in the tariff of charges. Each of these service profiles is identified by a unique service telephone number, and the telephone number of the service profile that is currently valid for the user is stored in the user record in the database 22. At the beginning of the access session, the user will be authorised with a default start profile or a personalized start profile according to the user preferences, or the profile last selected in the previous session.

Figure 2:
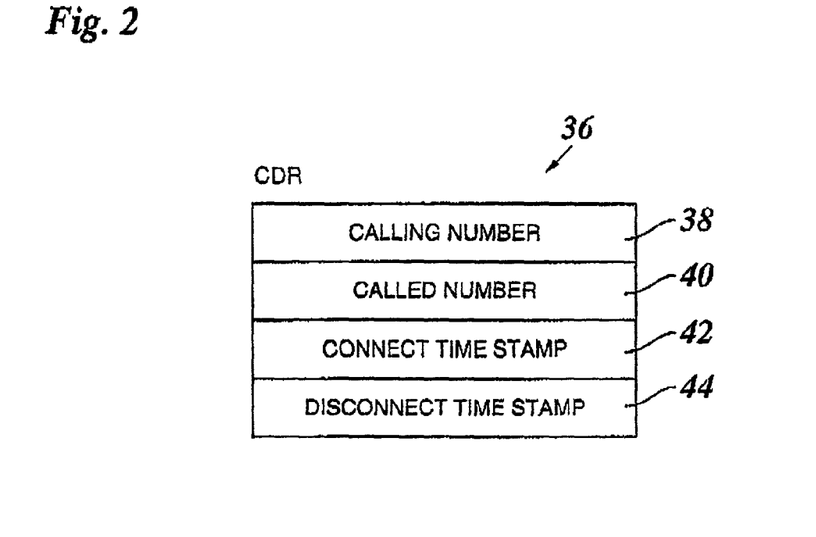
FIG. 2 an example of a call detail record.

At the beginning of the access session, a message is sent to the Internet Service Controller ISC) 24, and this message causes the ISC 24 to create a Call Detail Record (CDR) 86 which has essentially the format shown in FIG. 2. As an alternative, the CDR may be created by the NSS 18.

To create the CDR, the user telephone number that has been stored for the user 10 in the database 22 is entered in a field 36 "calling number" of the CDR 36. The service telephone number identifying the current service profile for this user is entered in a field 38 "called number". The connect time at which the user has logged on to the service profile is stored in a "connect time stamp" 40.

The user 10 may now visit various Internet sites to view the contents 20, to download information, etc., in accordance with the specifications of the service profile.

The Network Service Switch 18 allows to change the service profile during a session, i.e. without requiring the user to disconnect from the Internet and then to reconnect with a different service profile. When the user wishes to change the service profile, he visits the "Content and Policy &election Portal" 28 shown in FIG. 1. This website advises the user of the features of the available service profiles and of the respective tariffs and permits the user to select a new profile, When the user has selected another profile, this is signalled to the database 22, and the service telephone number stored in the user record is replaced by the service telephone number of the new profile. Optionally, a re-authentication may be performed by the RADIUS server 26. The fact that the service profile has been changed is also signalled to the ISC 24 which thereupon completes the previously created Call Detail Record 36 by storing the time at which the profile has been changed in a "disconnect time stamp" 44. Simultaneously, a new CDR will be created for the new rice profile.

The CDR 36 that has Just been completed is transmitted from the Internet Service Controller 24 to the billing system 34 of the PSTN, optionally via a mediation unit 46 which adapts the format of the CDR to the format used by the billing system 34, if necessary.

When the user 10 changes the service profile once again or disconnects from the Internet, the second CDR is completed and transmitted to the billing system 34 in the same manner.

Figure 3:
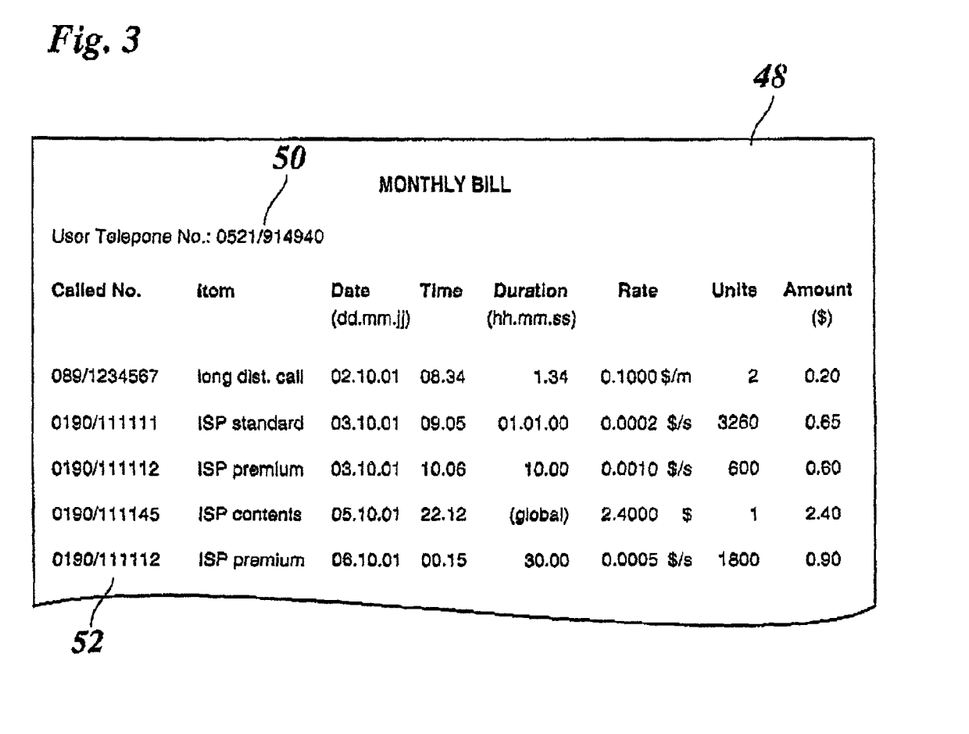
FIG. 3 an example of a bill for telephone and Internet services.

The billing system 34 treats the CDRs received from the Internet Service Controller 24 in the same way as CDRs for telephone calls. More specifically, the CDRs created by the ISC 24 are treated like CDRs for telephone calls in which the called number is service number for which a special tariff applies. By reference to a tariff data base, the billing system 24 calculates the charges for each item, i.e. for each part-session in which the user has used a single service profile. In this way, the billing system 34 creates a printed telephone bill which is sent to the user 10, e.g. in monthly intervals. An example of such a telephone bill 48 is shown in FIG. 3.

The use telephone number 50 is indicated in the header of the bill. The first column "called number" of the bill indicates the called numbers, including the service telephone numbers 52 which each represent a specific service profile. The next column "item" includes text explaining the nature of the billed items. The next three columns indicate the date, time and duration of the telephone call and of the Internet part-session, respectively, and the last three columns indicate the charge rate, the number of billed units and the billed amount, respectively.

In the example shown, the first item in the bill is a normal long distance telephone call which is billed on a per-minute basis. The second item is a part-session with a standard internet service profile identified by the telephone number 0900/111111. This part session has lasted one hour and one minute, i.e. 3260 seconds, and is billed on a per-second basis. The session with the standard profile has started on Oct. 3, 2001 at 09.05. As can be seen from the third line in the bill, the user has not logged off at the end of this session but has changed to a more expensive "premium" profile identified by the telephone number 0900/111112.

The fourth item in the bill 48 is an Internet session in which the user has selected a service profile which provides access to specific contents. This access is not billed on a time basis but is globally charged with 2.40 $.

The fifth item Is a part-session with the same service profile as in the third item (premium), but now the charge rate for this profile is smaller, because the access time fell within a low-traffic period (around midnight).

The item is a session with telephone number 0800/1112222 and tariff 0, indicating that the costs have been taken-over by a retailer A.

Figure 4:
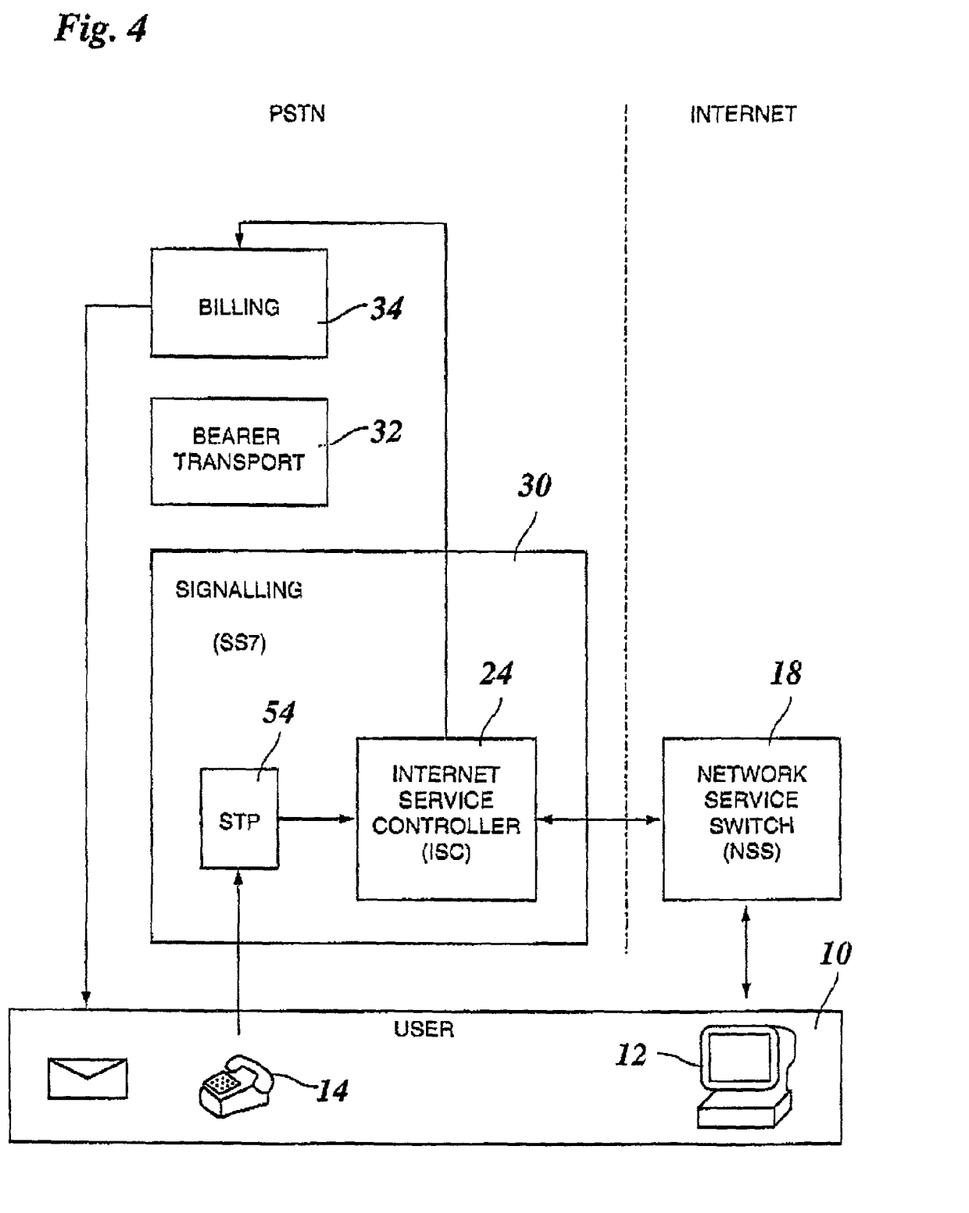
FIGS. 4 to 8 block diagrams illustrating modified embodiments of the invention.

FIG. 4 illustrates an embodiment in which the ISC 24 is located within the network operator's signalling system 30, e.g. an SS7 network, and co-operates directly with a Signalling Transfer Point (STP) 54 (a practical example for the STP is the "Broadband STP" of Nortel Networks Ltd.). The telephone 14 of the user is directly connected to the PSTN. The STP will be configured with call screening and will reject calls to the numbers associated with the respective service profiles (via standard call screening methods). However, it my invoke an announcement confirming via a standard voice message that the respective profile has been ordered—or at least that the signalling (called and calling number) will be forwarded to the ISP.

The called and calling number and optionally the timestamp will be extracted from the STP via an API (Application Program Interface) and will be forwarded to the ISC 24. The ISC will check in the database 22, whether the user who is identified by the calling number has previously agreed that he can order items via the telephone from this calling number terminal (telephone 14). If yes, the ISC will determine the associated user name (which may be the calling number or another user name) and change the service profile of the user to the service profile identified by the called number via sending a message to the NSS 18 to replace the current service profile with the new service profile with the name "called number". It should be noted that this scenario provides the best scalability from a voice network perspective, as the g is converted to the IP network very early in the network and does not have to exit any network. It is therefore anticipated that It will be not only the preferred scenario for incumbent operators (and potentially mobile operators as well), but also for the longer term in the event that a significant portion of the world's telephone network traffic may consist of such signalling, perhaps with a yet to be defined signalling interconnection to other network operators at the IP layer, in order to minimise the stress on the voice networks through a high number of short calls and unsuccessful call attempts.

Figure 5:
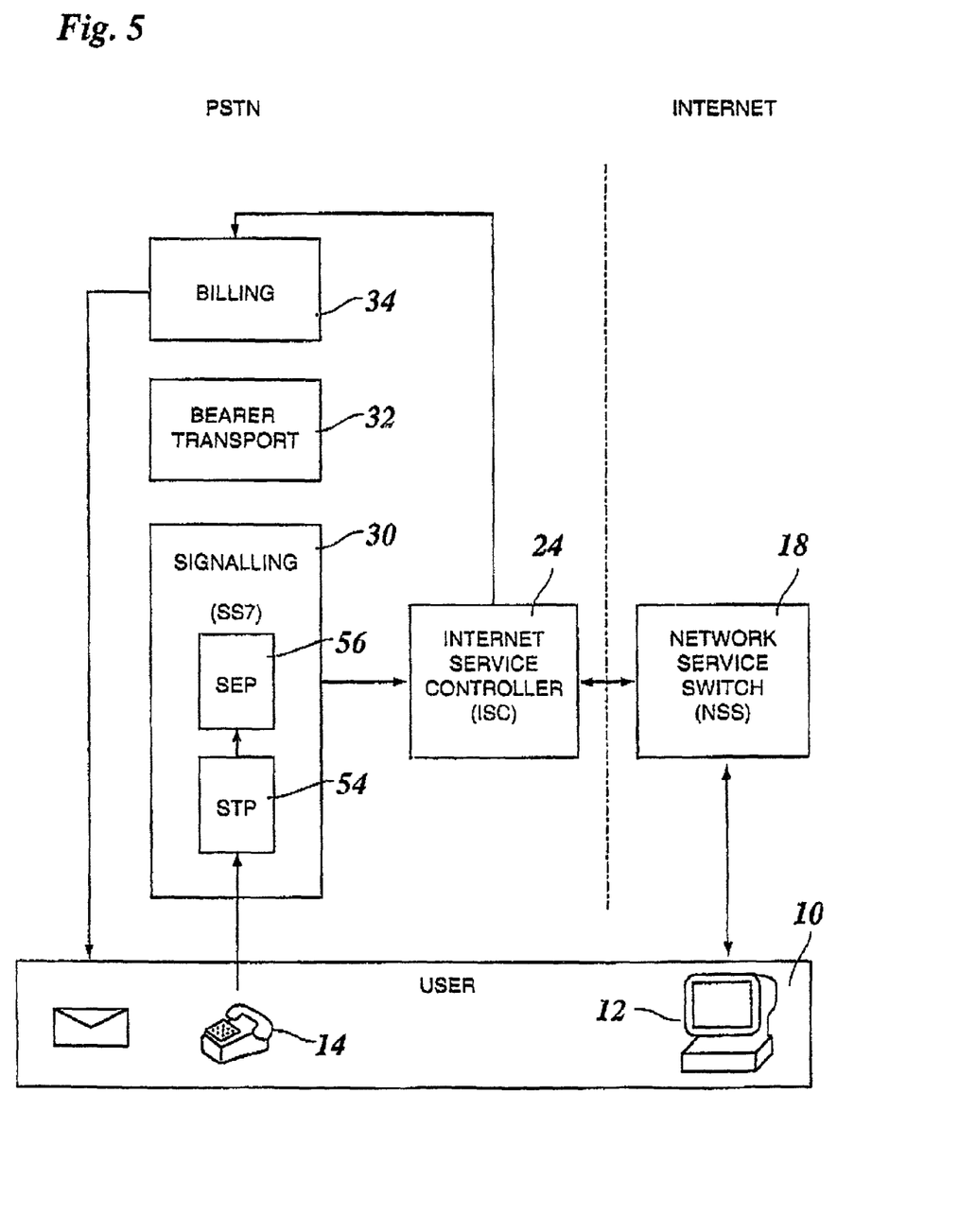

FIG. 5 shows an embodiment in which he call of the user 10 is forwarded to a Signalling End Point (SEP) 56 in the signalling system 30 of the telephone network. The signalling reaches the Signalling End Point 56 (such as the CSG (CVX SS7 Gateway) of Nortel Networks Ltd.) or a standard voice switch. The Signalling End Point may perform call screening directly or via consultation of another platform, such as the CPM (CVX Policy Manager) of Nortel Networks, Ltd., before accepting or rejecting the call. While rejecting the call, the signalling information consisting of called and calling number will be forwarded to the ISC 24 to proceed as in the previous embodiments.

Figure 6:
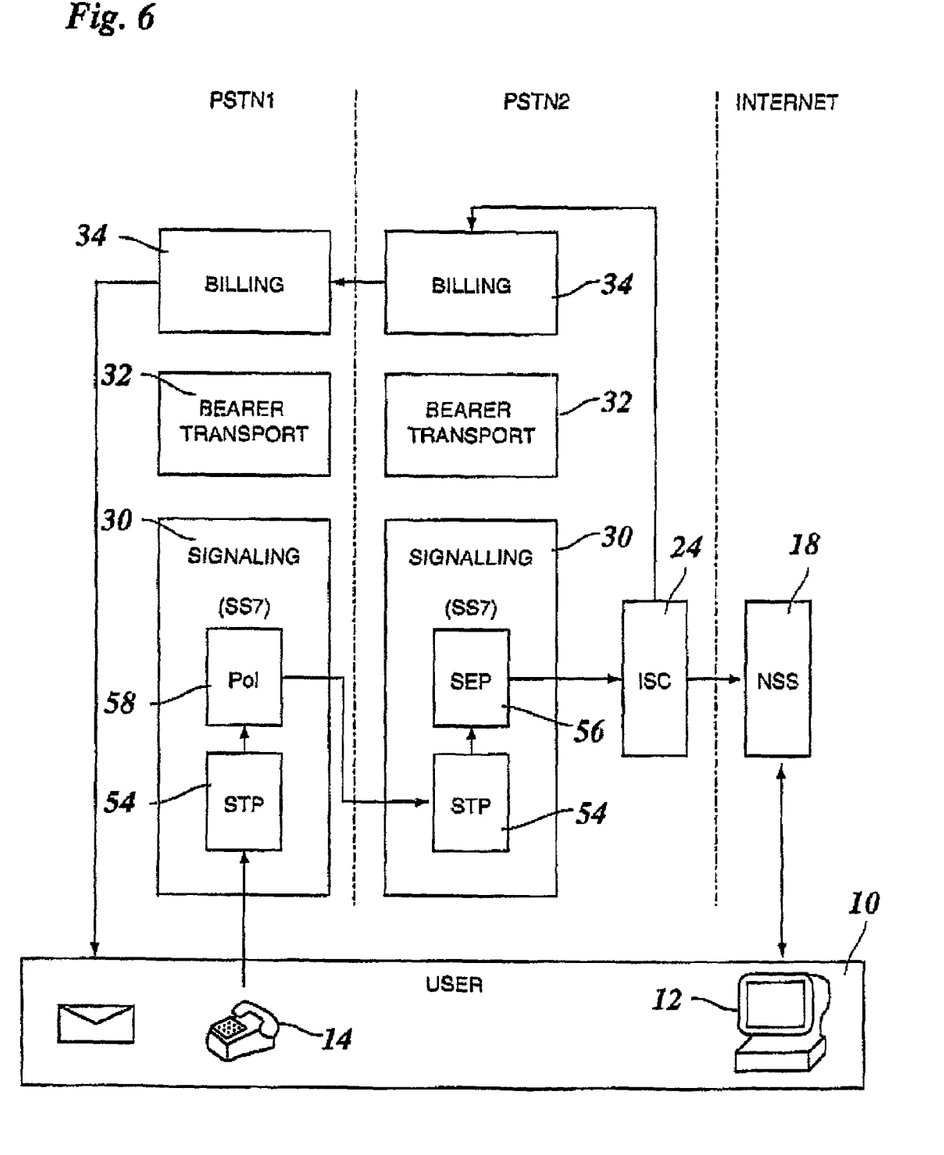

FIG. 6 shows an embodiment that differs from FIG. 5 in that the Signalling End Point 56 is a network PSTN2 which is not the same as the network PSTN1 that the user originating the call is attached to. Therefore the signalling has to traverse at least one Point of Interconnection (PoI) 58. It may be of particular interest to use SEPs which are normally the destination of long duration calls (such as Nortel's CSG), in order to mix the unsuccessful call attempts with long duration calls such as dial-up calls for Internet access. This allows better scalability of the voice network at the point of interconnection.

As It may not be in line with regulatory or competitive requirements to use the voice network for signalling without the intent to setup a call, the network operator may accept the call—however automatically clear the call after a very short duration (e.g. after one second). This can be performed by using the Signalling End Point 56. The SEP may clear the call after a short duration based on a special call screening procedure of his own, or in co-operation with other systems connected via signaling protocols such as RADIUS, A RADIUS authentication to a RADIUS Server may be started independently whether or not the user attempts to setup a PPP session. Thus the RADIUS Server receives the signalling information (called and calling number) and interacts with the ISC 24, which proceeds according to the embodiments described above.

Figure 7:
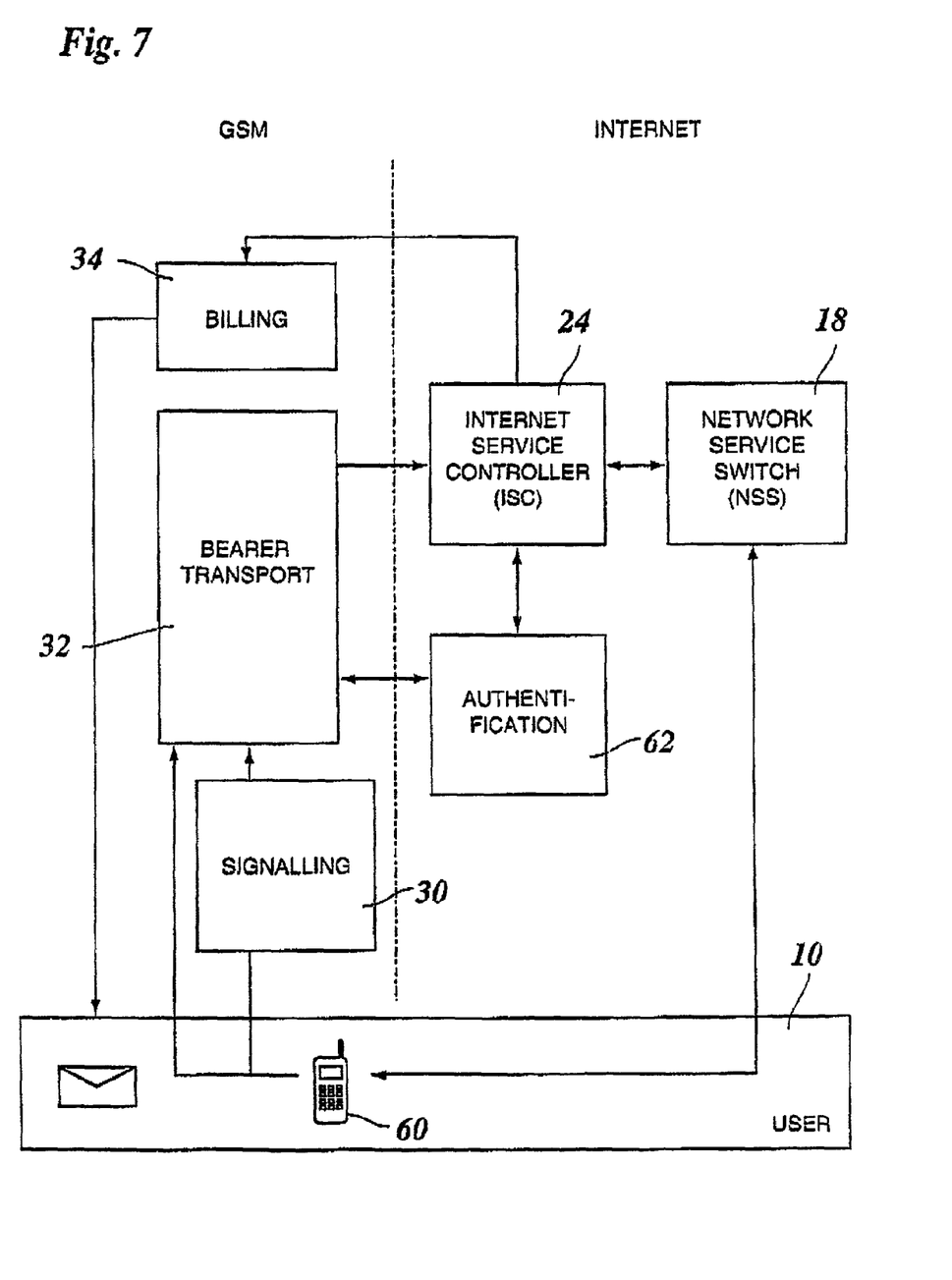

In FIG. 7, the fact that a short call is actually established, is symbolised by including the bearer transport system 32 of the telephone network in the signal path from the user 10 to the ISC 24.

Another modification, that has also been illustrated in FIG. 7 but may be employed in conjunction with the other embodiments as well, relates to the fact that the equipment of the user 10 consists of a mobile device such as a GSM/GPRS or UMTS phone 60. Thus, the Network Service Switch 18 can directly be accessed through the GPRS or UMTS data channel of the phone 60, whereas the telephone network is constituted by a separate voice channel of the phone 60. In his embodiment, the change of the service profile is particularly easy for the user 10, because the numbers of the favourite service profiles of the user may be stored in the telephone directory of the phone 60, and short-dialling keys on the key pad of the phone 60 may be assigned to these numbers, so that the user can send a profile selection call simply by pressing the appropriate button on this phone 60.

Of course, the feature that the profile selection is achieved by an established short call rather than by a non-established call may also be implemented in the case that the telephone network is a wireline PSTN network as in the previous embodiments. It is also possible that the profile selection call is passed-on from the network (PSTN1) of the incumbent operator to a network (PSTN2) of an alternate operator, as in FIG. 6. In fact, it is anticipated that, in the absence of a regulator mandated signalling-only interconnection method, the embodiment using established calls is most attractive for alternate operators, as it fully meets all known regulatory and contractual obligations from interconnection contracts while giving the alternate operator the opportunity to mix short duration calls with long duration calls in order to arrive at an acceptable average call hold time and not to put too much stress onto the voice switches at the points of Interconnection.

When established calls are used, the authentication may still be implicit in the sense that the ISC 24 does not require the user 10 to enter his user name and password or any other authentication token. It rather relies on the implicit authentication via the Calling Line ID, assuming that the originating telephone network has authenticated the calling line ID and is able to send a bill to the user. In countries like Germany, where network operators interconnect to each other and where the user can select his interexchange carrier on a call by call basis, and where the incumbent operator must include billing items into the bill he sends to his users, it is also possible that the interexchange carrier is the owner of the service numbers that represent the IP Services and that either the Interexchange carrier issues the bill himself, or be requests that the items will be included into the incumbant's bill, if he does not have a direct contract with the user, rather the user has dialled the service number owned by the interexchange changer carrier such in future a 0900 premium rate number or currently a 0190 premium rate number (and also a 0800 freephone number for sponsored access to Internet services such as access to certain e-business content sites).

However, in the embodiment shown in FIG. 7, a short call is set up, and some relevant inband communication takes place in order to authenticate the user through an authentication system 62. This explicit inband communication In the voice bearer transport system 32 may be in the form of an LCP procedure within the PPP protocol which could result in a username and password-based authentication or also in a username and one-time token based authentication, or also ended authentication with digital certificates or authentication tokens Alternatively, the user may be asked to enter a PIN-code for authentication. The authentication may also be based on voice recognition of the users voice with a certain preregistered keyword. It may also be more advanced (to prevent a malicious replay of recorded voice) by a new method where the network is challenging the user for a random keyword that the user has to repeat, with his voice spectrum parameters of the user being used to identify the user (user recognition via voice and via randomly created voice patterns used for authentication over the telephone). Alternatively or in addition, the user may be served by an operator who will provide an extra service to the user such as recommending the right service profile for a certain application that the user intends to use and invoking the service profile that the user demands.

Figure 8:
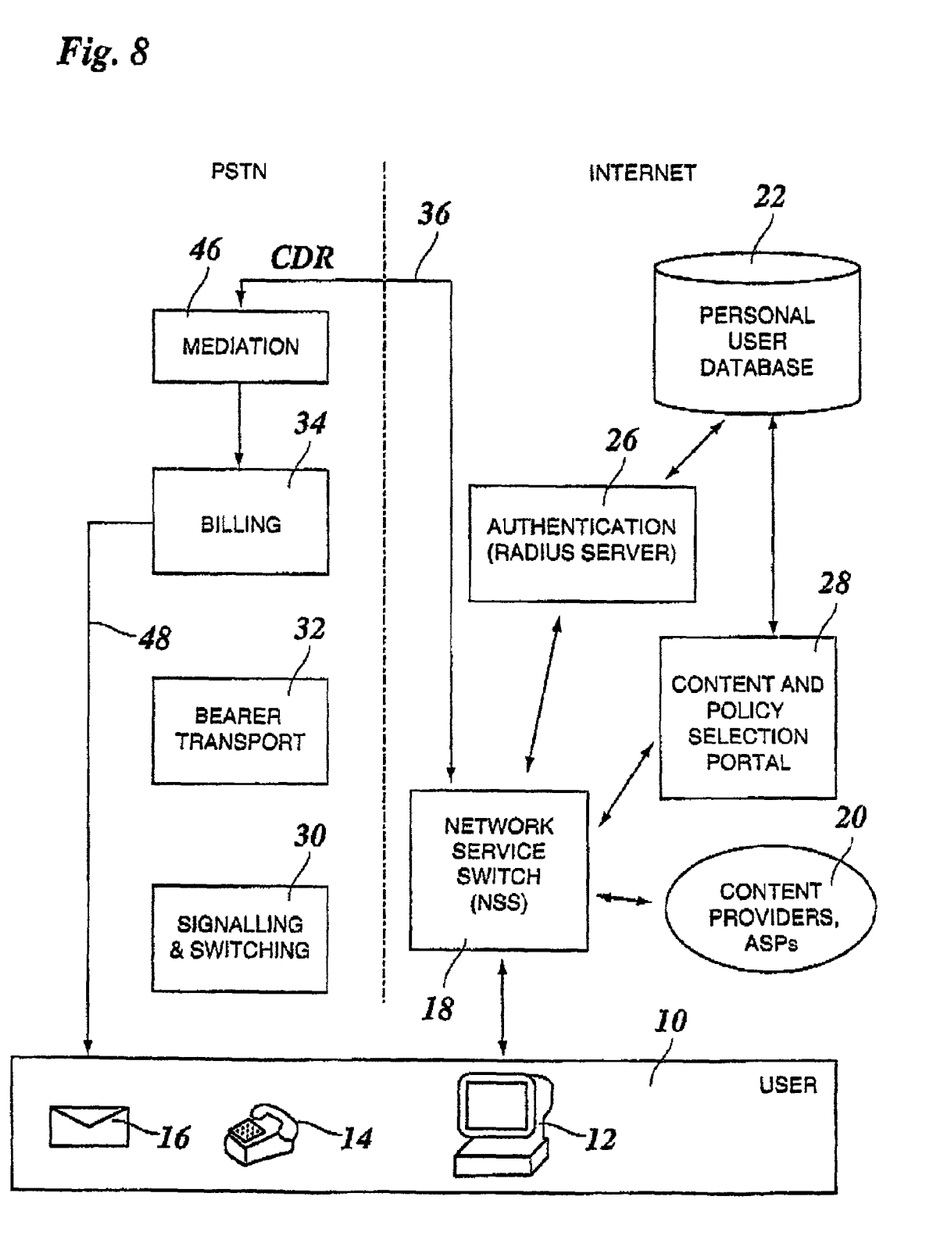

FIG. 8 illustrates an embodiment in which the CDRs are created in the NSS 18 which communicates directly with the billing system 34 (optionally through the mediation system 46) and with the Content and Policy Selection Portal 28, so that the ISC 24 (shown in FIG. 1) can be omitted.

The invention claimed is:

1. Method of providing and billing Internet services, wherein a user may select among a plurality of service profiles, comprising the steps of:
   assigning a service telephone number to each of said service profiles, such that each service profile is uniquely identified by its service telephone number,
   subscribing the user for being billed for Internet services and providing the user with a logon information associated with a user telephone number and identifying at least one of said service profiles with said logon information;
   storing said logon information and said at least one identified service profile in a database;
   when the user selects and using said logon information logs on to one of said service profiles, accessing said database to check whether the user has subscribed for being billed for that service profile on said user telephone number through a telephone network operator, and, if this is the case, allowing access to the selected service profile,
   when access is allowed, creating a call detail record including the user telephone number as calling number and the service telephone number of the selected service profile as called number, and
   transmitting the call detail record to a billing system of said telephone network operator.

2. Method according to claim 1, wherein the service profile is selected by the user by calling the service telephone number via a telephone network.

3. Method according to claim 2, wherein said telephone network is a wireless network.

4. Method according to claim 2, wherein the selection of the service profile is achieved by a non-established call which is rejected in a signalling system of the telephone network.

5. Method according to claim 2, wherein the selection of the service profile is achieved by an established call forwarded through at least one telephone network to an Internet service controller.

6. Method according to claim 5, wherein said established call is used for authentication of the user.

7. Method according to claim 6, wherein authentication of the user comprises the steps of challenging the user for a random keyword that the user has to repeat, detecting voice spectrum parameters of the user, when he repeats the keyword, and identifying the user on the basis of said voice spectrum parameters.

8. A system for providing and billing Internet services, including an Internet Service Provider ("ISP") and a telephone network operator, wherein
   a user may select among a plurality of service profiles;
   each one of said plurality of selectable service profiles is uniquely identified by its service telephone number;
   the user is subscribed for being billed for Internet Services and provided with a logon information associated with a user telephone number; and,
   at least one of said plurality of selectable service profiles is identified with said logon information;
   the system comprising:
   a network service switch through which the user has access to one of said plurality of selectable service profiles,
   a database coupled to said network service switch configured to store user information, including said logon information and said at least one identified service profile; and
   monitoring means coupled to said database and said network service switch configured to monitor access sessions of the user, said monitoring means are configured to create a call detail record to be sent to said billing system, said call detail record including, as calling number, the user telephone number and, as called number, a service telephone number identifying the selected service profile, and
   a billing system, provided by the telephone network operator and coupled to said monitoring means, configured to process call detail records of telephone calls transmitted from said monitoring means,
   wherein when the user selects and, using said logon information, logs on to one of said service profiles, said network service switch accesses said database to check whether the user has subscribed for being billed for that service profile on said user telephone number through said telephone network operator, and, if this is the case, allows access to said selected service profile.

9. System according to claim 8, wherein said monitoring means are included in a signalling system of a telephone network.

10. System according to claim 8, wherein said network service switch is configured to change the one of the plurality of selectable service profiles upon a command entered by the user, while the user remains connected to the Internet.

11. System according to claim 10, wherein the monitoring means are configured to receive said command to change the service profile through the telephone network and to forward this command to the network service switch.

* * * * *